United States Patent
Kubo

(10) Patent No.: US 7,451,610 B2
(45) Date of Patent: Nov. 18, 2008

(54) VEHICLE AIR CONDITIONING SYSTEM

(75) Inventor: Mamoru Kubo, Isesaki (JP)

(73) Assignee: Sanyo Electric Co., Ltd., Osaka (JP)

( * ) Notice: Subject to any disclaimer, the term of this patent is extended or adjusted under 35 U.S.C. 154(b) by 654 days.

(21) Appl. No.: 11/056,394

(22) Filed: Feb. 14, 2005

(65) Prior Publication Data
US 2005/0183433 A1 Aug. 25, 2005

(30) Foreign Application Priority Data
Feb. 16, 2004 (JP) .............................. 2004-038373

(51) Int. Cl.
F25B 1/00 (2006.01)
F25B 49/00 (2006.01)
B60H 1/32 (2006.01)

(52) U.S. Cl. .................. 62/228.4; 62/228.1; 62/244

(58) Field of Classification Search ................ 62/228.1, 62/228.4, 239, 186, 244
See application file for complete search history.

(56) References Cited

U.S. PATENT DOCUMENTS

| | | | |
|---|---|---|---|
| 5,316,074 A | | 5/1994 | Isaji et al. |
| 5,330,385 A | | 7/1994 | Hotta et al. |
| 5,475,986 A | * | 12/1995 | Bahel et al. .................. 62/160 |
| 6,588,222 B1 | | 7/2003 | Urbank et al. |

FOREIGN PATENT DOCUMENTS

| | | |
|---|---|---|
| EP | 0 726 180 A1 | 8/1996 |
| JP | 4-5121 | 1/1992 |
| JP | 9-300951 | 11/1997 |
| JP | 10220845 A * | 8/1998 |
| JP | 3152154 | 1/2001 |

* cited by examiner

Primary Examiner—Chen-Wen Jiang
(74) Attorney, Agent, or Firm—McDermott Will & Emery LLP

(57) ABSTRACT

A vehicle air conditioning system equipped with a refrigerant circuit comprising an electrically operated compressor is intended to enable simplification of data communication between the inside and outside of a passenger compartment and to enable accurate air conditioning control. In summary, the air conditioning system is equipped with the refrigerant circuit which includes the electrically operated compressor, a gas cooler, an expansion valve, an evaporator and the like that are sequentially pipe-connected in a circular form, in which compression and heat release of a refrigerant are performed by the electrically operated compressor and the gas cooler provided outside a passenger compartment and in which the passenger compartment is cooled by the evaporator provided inside the passenger compartment, and the air conditioning system comprises: an inverter for frequency control of an operation of the electrically operated compressor; and an air conditioning amplifier to which a predetermined operation input is performed and to which information regarding the inside of the passenger compartment is input, wherein the inverter calculates an operating frequency of the electrically operated compressor on the basis of the information from the air conditioning amplifier to operate the electrically operated compressor.

2 Claims, 2 Drawing Sheets

VEHICLE AIR CONDITIONING SYSTEM

BACKGROUND OF THE INVENTION

The present invention relates to a vehicle air conditioning system equipped with a refrigerant circuit comprising an electrically operated compressor.

An air conditioning system in a passenger compartment of a vehicle such as an automobile has heretofore been equipped with an engine-driven compressor provided in an engine room outside the passenger compartment, and this compressor and an evaporator which configures a refrigerant circuit are provided in the passenger compartment to perform cooling. However, it has recently been considered to use an air conditioning system equipped with an electrically operated compressor driven by a power supply of a battery, especially in electric automobiles and hybrid automobiles.

In this case, the following method has been conventionally employed (e.g., refer to U.S. Pat. No. 3,152,154). The temperature of the evaporator, the amount of solar radiation into the passenger compartment and the temperature in the passenger compartment are loaded into a controller in the passenger compartment called an air conditioning amplifier provided in the passenger compartment. On the other hand, an inverter is provided outside the passenger compartment, for example, in the engine room, and the temperature at an exit of a heat exchanger of the refrigerant circuit, the outside air temperature and the like are loaded into the air conditioning amplifier via the inverter by serial communication, thereby calculating an operating frequency of the electrically operated compressor necessary for the air conditioning amplifier to perform air-conditioning in the passenger compartment. Then, the calculated data is sent to the inverter by serial communication, and the frequency of the operation of the electrically operated compressor is controlled.

However, in such a conventional control method, the amount of data is increased in the communication between the air conditioning amplifier provided in the passenger compartment and the inverter outside the passenger compartment, which complicates the control. Moreover, since the refrigerant circuit has to be controlled by the air conditioning amplifier, a control algorithm is complicated, and particularly when manufacturers of equipment inside and outside the passenger compartment are different, this poses a problem that cooperation is difficult in terms of know-how, which causes trouble for accurate air conditioning control.

SUMMARY OF THE INVENTION

The present invention has been attained to solve the foregoing conventional technical problems, and is intended for a vehicle air conditioning system equipped with a refrigerant circuit comprising an electrically operated compressor which can simplify data communication between the inside and outside of a passenger compartment and which can achieve accurate air conditioning control.

A vehicle air conditioning system of the present invention is equipped with a refrigerant circuit which includes an electrically operated compressor, a heat exchanger, an expansion valve, an evaporator and the like that are sequentially pipe-connected in a circular form, in which compression and heat release of a refrigerant are performed by the electrically operated compressor and the heat exchanger provided outside a passenger compartment and in which the passenger compartment is cooled by the evaporator provided inside the passenger compartment, and the vehicle air conditioning system comprises: an outer-compartment controller for frequency control of an operation of the electrically operated compressor; and an inner-compartment controller to which a predetermined operation input is performed and to which information regarding the inside of the passenger compartment is input, wherein the outer-compartment controller calculates an operating frequency of the electrically operated compressor on the basis of the information from the inner-compartment controller to operate the electrically operated compressor.

Furthermore, the vehicle air conditioning system of the present invention is characterized in that, in the above, the outer-compartment controller calculates an opening of the expansion valve on the basis of the information from the inner-compartment controller to control the expansion valve.

Furthermore, the vehicle air conditioning system of the present invention is characterized in that, in the above invention, sensor information regarding the outside of the passenger compartment is input to the outer-compartment controller, and on the basis of this information and the information from the inner-compartment controller, a blower fan for air-cooling the heat exchanger is controlled.

In the present invention, a vehicle air conditioning system is equipped with a refrigerant circuit which includes an electrically operated compressor, a heat exchanger, an expansion valve, an evaporator and the like that are sequentially pipe-connected in a circular form, in which compression and heat release of a refrigerant are performed by the electrically operated compressor and the heat exchanger provided outside a passenger compartment and in which the passenger compartment is cooled by the evaporator provided inside the passenger compartment, and the vehicle air conditioning system comprises an outer-compartment controller for frequency control of an operation of the electrically operated compressor; and an inner-compartment controller to which a predetermined operation input is performed and to which information regarding the inside of the passenger compartment is input, wherein the outer-compartment controller calculates an operating frequency of the electrically operated compressor on the basis of the information from the inner-compartment controller to operate the electrically operated compressor. Thus, the amount of data is significantly reduced in a communication between the inner-compartment controller and the outer-compartment controller, and a control algorithm in the inner-compartment controller can be simplified.

That is, it is not necessary to control the refrigerant circuit by the inner-compartment controller, so that, for example, particularly when manufacturers of equipment inside and outside the passenger compartment are different, accurate air conditioning control can be achieved utilizing the know-how on refrigerant circuit control of the manufacture of the equipment outside the vehicle, in addition to higher versatility.

Furthermore, if the outer-compartment controller also calculates an opening of the expansion valve on the basis of the information from the inner-compartment controller to control the expansion valve, it is possible to achieve a further reduction in the communication data amount and more accurate refrigerant circuit control.

Moreover, if sensor information regarding the outside of the passenger compartment is input to the outer-compartment controller, and on the basis of this information and the information from the inner-compartment controller, the outer-compartment controller controls a blower fan for air-cooling the heat exchanger, it is possible to achieve a still further reduction in the communication data amount and more accurate refrigerant circuit control.

DETAILED DESCRIPTION OF THE PREFERRED EMBODIMENT

Embodiments realizing a vehicle air conditioning system of the present invention will be hereinafter described in reference to the drawings.

Embodiment 1

Figure 1:
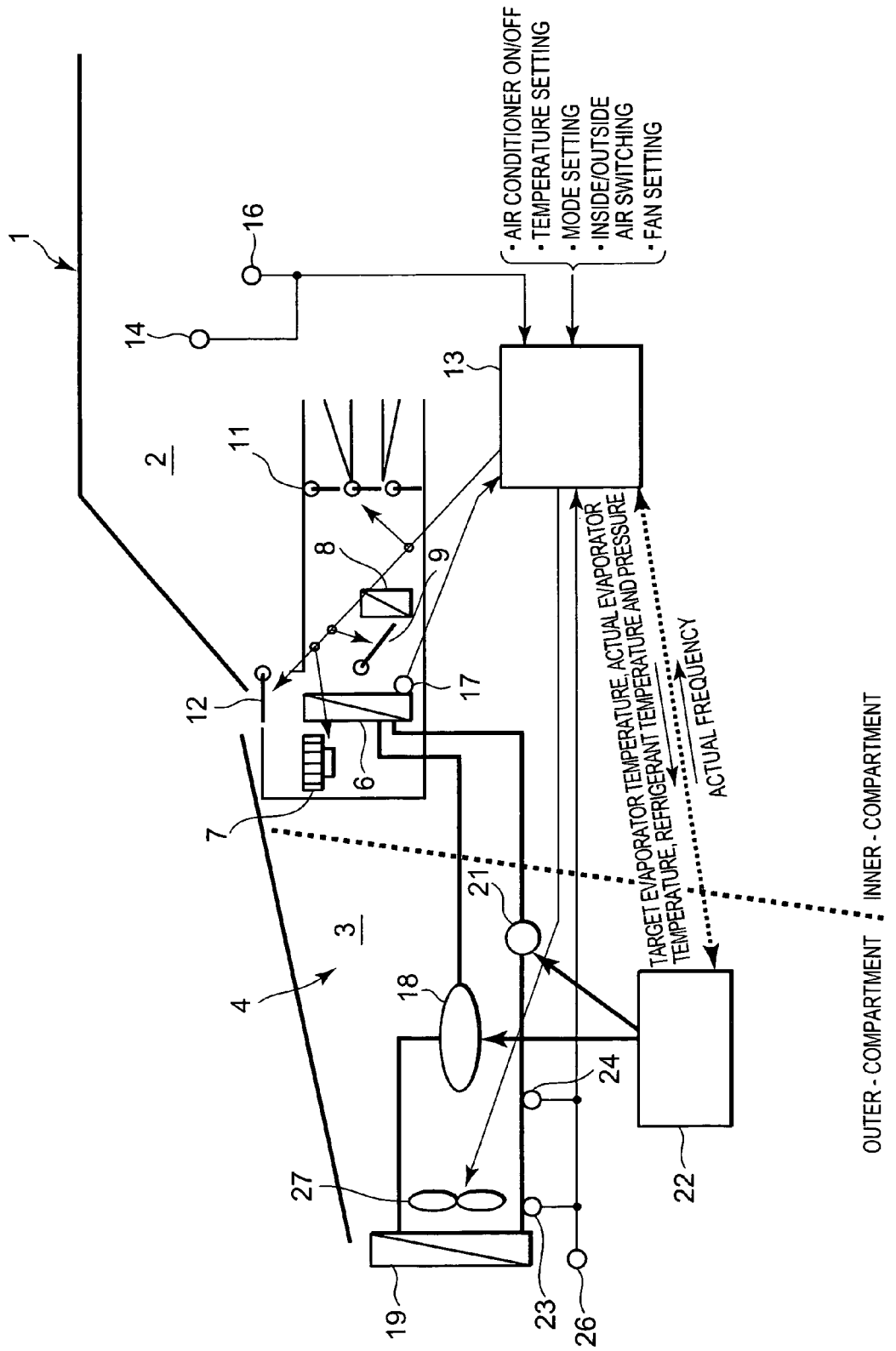
FIG. 1 is a schematic perspective view of a front part of a vehicle in one embodiment to which the present invention is applied (Embodiment 1)

FIG. 1 is a schematic perspective view of a front part of a vehicle 1 illustrating one embodiment to which the present invention is applied. The vehicle 1 shown here is a hybrid automobile comprising a main shaft motor and an engine for driving, but besides, the present invention is also applicable to electric automobiles, fuel cell vehicles and ordinary engine driven automobiles. 2 denotes a passenger compartment which passengers get in, and 3 denotes an engine room constructed in the front part of the vehicle 1 outside the passenger compartment 2.

In the passenger compartment 2, there are provided an evaporator 6 which configures a refrigerant circuit of an air conditioning system 4 of the present invention, a heater core 8 in which radiator fluid of the engine runs, a blower fan 7 to blow air with which heat exchange has been performed by the evaporator 6 and the heater core 8, an air mix door 9 which controls a mixing ratio of the air with which heat exchange has been performed by the evaporator 6 and the heater core 8, a mode switch door 11 to switch air blower outlets, inside/outside air switch damper 12, and an air conditioning amplifier 13 as an inner-compartment controller. The air conditioning amplifier 13 comprises a general purpose microcomputer, and to this air conditioning amplifier 13, information is input from a solar radiation sensor 14 which detects the amount of solar radiation into the passenger compartment 2, an inside air sensor 16 which detects the temperature in the passenger compartment 2, and an evaporator temperature sensor 17 which detects a blowing air temperature of the evaporator 6. Further, an unshown operation panel is provided for the air conditioning amplifier 13, and this operation panel is used for operation input to the air conditioning amplifier 13, for example, to turn on/off an air conditioner, to set the temperature in the passenger compartment 2, to set a mode, to switch inside/outside air, and to set the fan.

On the other hand, in the engine room 3 outside the passenger compartment 2, there are provided an electrically operated compressor 18 which configures the refrigerant circuit of the air conditioning system 4, a gas cooler 19 as a heat exchanger, an expansion valve (decompressor) 21, and an inverter 22 as an outer-compartment controller, in addition to drive equipment such as the above-described main shaft motor, an unshown battery, the above-described engine and a radiator, etc. The inverter 22 comprises a switching element group for frequency control of the operation of the general-purpose microcomputer and the electrically operated compressor 18. The inverter 22 and the air conditioning amplifier 13 send and receive data by serial communication.

The electrically operated compressor 18 incorporates, in an unshown sealed container, a motor and a compression mechanism (e.g., rotary type) driven by the battery, and the electrically operated compressor 18, the gas cooler 19, the expansion valve 21 and the evaporator 6 are sequentially pipe-connected in a circular form to configure the refrigerant circuit of the air conditioning system 4. Then, a predetermined amount of carbon dioxide ($CO_2$) refrigerant is sealed into the refrigerant circuit. It is to be noted that, for example, a refrigerant such as ordinary R-134a or a hydrocarbon refrigerant can be used as the refrigerant in addition to carbon dioxide in the embodiment.

In this embodiment, information is input to the air conditioning amplifier 13 from a refrigerant temperature sensor 23 and a pressure sensor 24 which detect refrigerant temperature and pressure on a high-pressure side of the refrigerant circuit of the air conditioning system 4 provided in the engine room 3, and from an outside air temperature 26 which detects the outside air temperature. Further, 27 denotes a radiator fan (blower fan) to air-cool the gas cooler 19 and the radiator.

An operation of the air conditioning system 4 of the present invention with the above configuration will be described. The air conditioning amplifier 13 calculates a target blowing air temperature of the evaporator on the basis of a set temperature in the passenger compartment 2 input by the operation panel and of information (environmental information in the passenger compartment) from the solar radiation sensor 14, the inside air sensor 16, the evaporator temperature sensor 17, the refrigerant temperature sensor 23, the pressure sensor 24 and the outside air temperature 26. Moreover, in order to bring the temperature in the passenger compartment 2 close to the set temperature, the operation of the blower fan 7 is controlled, a ratio of mixing air from the evaporator 6 and the heater core 8 is controlled by the air mix door 9, the air blower outlets are controlled by the mode switch door 11, and the operation of the radiator fan 27 is controlled.

Furthermore, the air conditioning amplifier 13 sends, to the inverter 22 by serial communication, the calculated target blowing air temperature of the evaporator and an actual blowing air temperature of the evaporator, the refrigerant temperature, the refrigerant pressure (information) and the like. The inverter 22 calculates an operating frequency of the electrically operated compressor 18 necessary to bring the blowing air temperature of the evaporator to the target temperature from the information such as the target blowing air temperature of the evaporator and the actual blowing air temperature of the evaporator received from the air conditioning amplifier 13, thereby operating the electrically operated compressor 18 at the calculated operating frequency. It also calculates an opening of the expansion valve 21 from the refrigerant temperature, the refrigerant pressure and the like to adjust the expansion valve 21.

When the electrically operated compressor 18 is operated, a compressed gas refrigerant at high temperature and high pressure is discharged from the electrically operated compressor 18 to the gas cooler 19, where it is air-cooled by driving wind and the radiator fan 27 for heat release. Next, the refrigerant reaches the expansion valve 21, and becomes a mutiphase flow of liquid/gas in a process of passing through the expansion valve 21, and then enters the evaporator 6. The refrigerant which has entered the evaporator 6 evaporates therein when it deprives vaporization latent heat of the ambience to exert a cooling function (decrease the evaporator temperature). This cooling function is adjusted by the operating frequency of the electrically operated compressor 18, and the passenger compartment 2 is cooled by this cooling function. The refrigerant which has exited from the evaporator 6 is again sucked into the electrically operated compressor 18 to repeat a circulation.

Furthermore, the inverter 22 performs limiting control on the electrically operated compressor 18 to give priority to driving, for example, when a load on the battery is excessive or when an electric storage amount is decreased. Then, the inverter 22 reports the actual operating frequency of the electrically operated compressor 18 to the air conditioning amplifier 13.

With such a configuration, the amount of data is significantly decreased in the communication between the air conditioning amplifier 13 in the passenger compartment 2 and the inverter 22 in the engine room 3, and it is not necessary to control the refrigerant circuit of the air conditioning system 4 (the electrically operated compressor 18 and the expansion valve 21) by the air conditioning amplifier 13, so that a control algorithm in the air conditioning amplifier 13 is significantly simplified.

Therefore, for example, when a manufacture providing the refrigerant circuit and the inverter 22 and a manufacture providing the air conditioning amplifier 13 and equipment in the passenger compartment 2 are different, know-how of the former manufacture can be utilized for refrigerant circuit control, thereby enabling accurate air conditioning control and higher versatility. Moreover, the inverter 22 calculates and controls the opening of the expansion valve 21 so that the refrigerant circuit can be protected when the temperature and pressure on the high-pressure side are abnormal.

Embodiment 2

Figure 2:
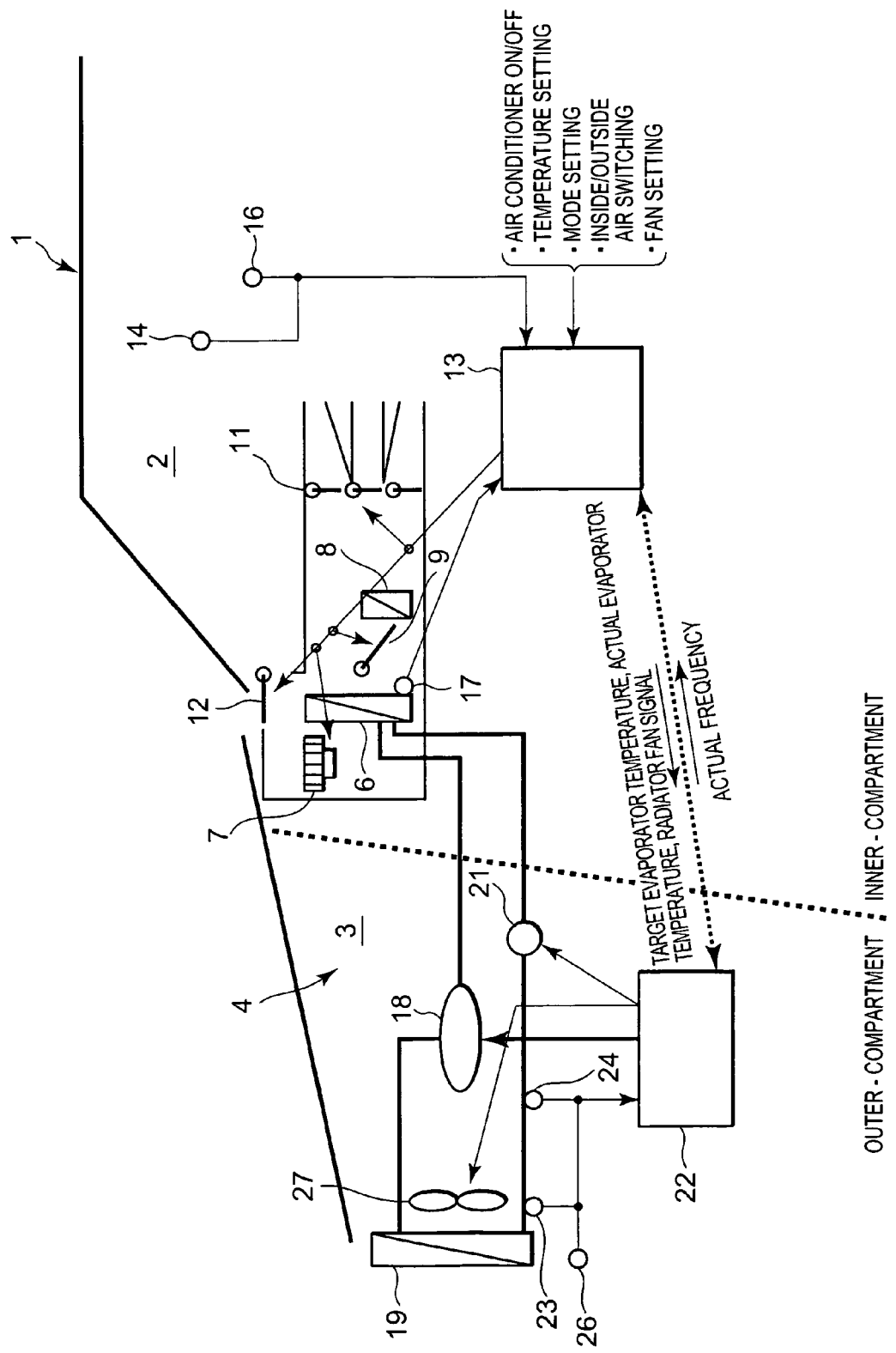
FIG. 2 is a schematic perspective view of the front part of the vehicle in another embodiment to which the present invention is applied (Embodiment 2).

Next, FIG. 2 shows another embodiment of the present invention. It is to be noted that those indicated with the same signs as in FIG. 1 exert the same or similar function in FIG. 2. In this case, information from the refrigerant temperature sensor 23 in the engine room 3, the pressure sensor 24 and the outside air temperature 26 is input to the inverter 22, and the radiator fan 27 is connected to this inverter 22.

In the above configuration, the air conditioning amplifier 13 in this case calculates the target blowing air temperature of the evaporator on the basis of the set temperature in the passenger compartment 2 input by the operation panel and of the information (environmental information in the passenger compartment) from the solar radiation sensor 14, the inside air sensor 16 and the evaporator temperature sensor 17. Moreover, in order to bring the temperature in the passenger compartment 2 close to the set temperature, the operation of the blower fan 7 is controlled, the ratio of mixing air from the evaporator 6 and the heater core 8 is controlled by the air mix door 9, and the air blower outlets are controlled by the mode switch door 11. In addition, the rate of the radiator fan 27 is calculated.

Furthermore, the air conditioning amplifier 13 sends, to the inverter 22 by serial communication, the calculated target blowing air temperature of the evaporator and the actual blowing air temperature of the evaporator, signals (information) regarding the rate of the radiator fan 27 and the like. The inverter 22 calculates the operating frequency of the electrically operated compressor 18 necessary to bring the blowing air temperature of the evaporator to the target temperature, from the information such as the target blowing air temperature of the evaporator and the actual blowing air temperature of the evaporator received from the air conditioning amplifier 13, thereby operating the electrically operated compressor 18 at the calculated operating frequency. Moreover, the operation of the radiator fan 22 is controlled on the basis of the signals regarding the rate of the radiator fan 27.

Moreover, the inverter 22 calculates and adjusts the opening of the expansion valve 21 on the basis of the information regarding the refrigerant temperature and pressure from the refrigerant temperature sensor 23, the pressure sensor 24 and the outside air temperature 26. Further, the inverter 22 again performs the limiting control on the electrically operated compressor 18 to give priority to driving, for example, when the load on the battery is excessive or when the electric storage amount is decreased. Then, the inverter 22 reports the actual operating frequency of the electrically operated compressor 18 to the air conditioning amplifier 13.

In this way, also in this embodiment, the amount of data is significantly decreased in the communication between the air conditioning amplifier 13 in the passenger compartment 2 and the inverter 22 in the engine room 3, and it is not necessary to control the refrigerant circuit of the air conditioning system 4 (the electrically operated compressor 18 and the expansion valve 21) by the air conditioning amplifier 13, so that the control algorithm in the air conditioning amplifier 13 is significantly simplified.

Therefore, for example, when the manufacture providing the refrigerant circuit and the inverter 22 and the manufacture providing the air conditioning amplifier 13 and the equipment in the passenger compartment 2 are different, the know-how of the former manufacture can be utilized for the refrigerant circuit control, thereby enabling the accurate air conditioning control and higher versatility. Moreover, the inverter 22 calculates and controls the opening of the expansion valve 21 so that the refrigerant circuit can be protected when the temperature and pressure on the high-pressure side are abnormal.

It is to be noted that the expansion valve 21 is provided on the side of the engine room 3 in the embodiments, but it is not limited thereto and may be disposed in the passenger compartment 2 depending on the refrigerant to be used. In such a case, the opening of the expansion valve 21 is also controlled by the inverter 22. Moreover, carbon dioxide which brings the high-pressure side into a supercritical state is used so that the heat exchanger serves as the gas cooler to release heat from the refrigerant in the embodiments, but this is not a limitation and it is also effective in the present invention if the ordinary R-134a or the HC refrigerant is used to condense the refrigerant in the heat exchanger.

What is claimed is:

1. A vehicle air conditioning system equipped with a refrigerant circuit which includes an electrically operated compressor, a heat exchanger, an expansion valve, and an evaporator that are sequentially pipe-connected in a circular form, in which compression and heat release of a refrigerant are performed by the electrically operated compressor and the heat exchanger provided outside a passenger compartment, and in which the passenger compartment is cooled by the evaporator provided inside the passenger compartment, the vehicle air conditioning system comprising:

an outer-compartment controller for frequency control of an operation of the electrically operated compressor; and an inner-compartment controller to which a predetermined operation input is performed and to which information regarding the inside of the passenger compartment is input, wherein the outer-compartment controller calculates an operating frequency of the electrically operated compressor on the basis of information from the inner-compartment controller to operate the electrically operated compressor; and wherein the outer-compartment controller calculates an opening of the expansion valve on the basis of the information from the inner-compartment controller to control the expansion valve.

2. The vehicle air conditioning system according to claim 1, wherein sensor information regarding the outside of the passenger compartment is input to the outer-compartment controller, and on the basis of the sensor information and the information from the inner-compartment controller, a blower fan for air-cooling the heat exchanger is controlled.

* * * * *